H. W. FOUTZ.
Governor.
No. 202,430.   Patented April 16, 1878.
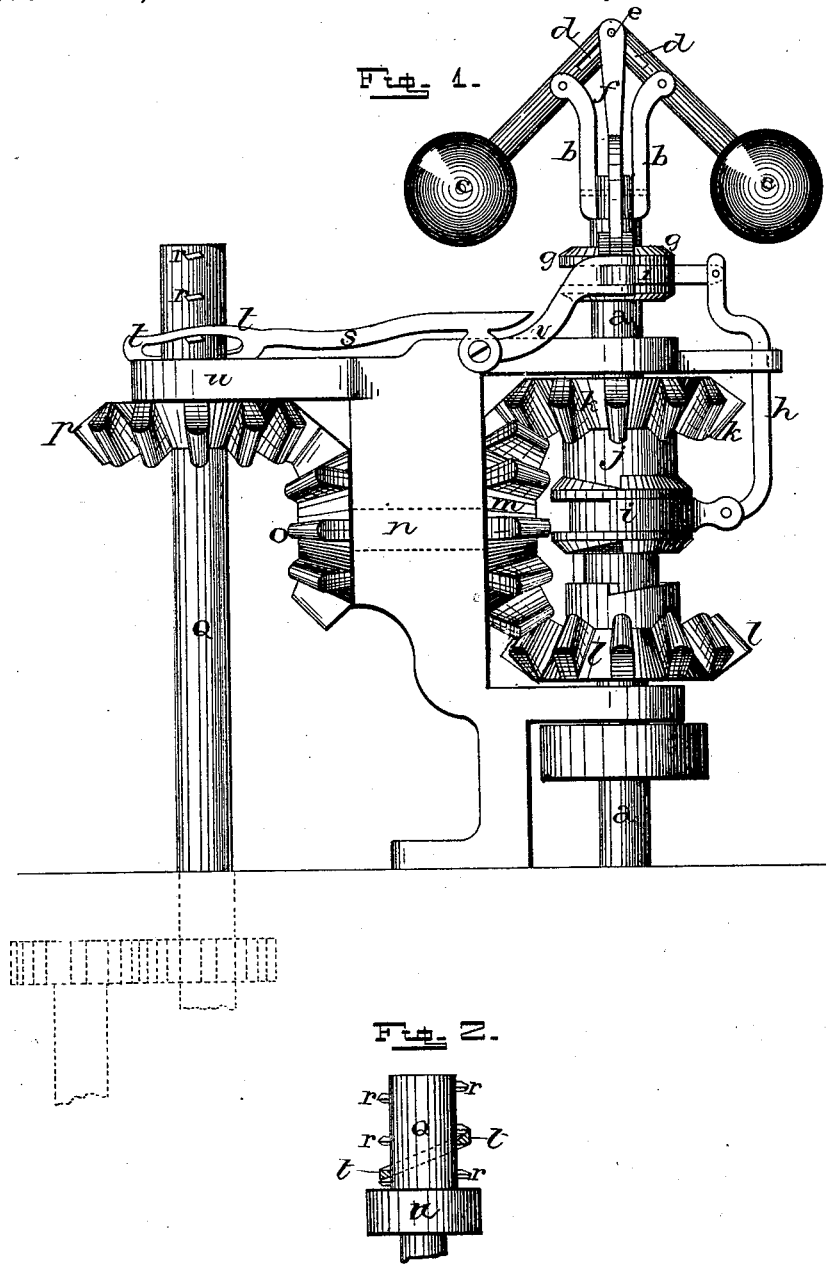

UNITED STATES PATENT OFFICE.

HENRY W. FOUTZ, OF BELLEFONTE, PENNSYLVANIA.

IMPROVEMENT IN GOVERNORS.

Specification forming part of Letters Patent No. 202,430, dated April 16, 1878; application filed March 18, 1878.

*To all whom it may concern:*

Be it known that I, HENRY W. FOUTZ, of Bellefonte, in the county of Centre and State of Pennsylvania, have invented certain new and useful Improvements in Governors; and I do hereby declare the following to be a full, clear, and exact description of the invention, such as will enable others skilled in the art to which it pertains to make and use it, reference being had to the accompanying drawings, which form part of this specification.

My invention relates to an improvement in steam and water governors; and it consists in the arrangement and combination of parts, that will be more fully described hereinafter, whereby a governor is produced for operating any kind of a valve or gate, and which will control the speed quickly and surely.

The accompanying drawings represent my invention.

$a$ represents the governor-shaft, to the upper end of which are fastened the two standards $b$, upon which the balls $c$ are pivoted, as shown. The inner ends of the ball-arms have the slots $d$ made through them, so as to allow them to accommodate themselves to any position, and through these slots passes the pin or bolt $e$, which binds the balls to the standard or connecting-rod $f$. The lower end of this connecting-rod, which is made bifurcated, so as to straddle over the top of the shaft $a$, is fastened to the vertically-moving collar $g$. This collar revolves freely around, and is connected, by means of the bent rod $h$, with the double vertically-moving clutch $i$, which is feathered upon the sleeve $j$, and made to engage with either one of the beveled gears $k$ $l$, for the purpose of reversing the motion of the gate-shaft Q. When midway between these two gears, the clutch engages with neither one; but as soon as it is either raised or depressed it engages with one or the other, which, in turn, operates the large gear $m$ on the horizontal shaft $n$, and when one of the wheels $k$ $l$ $m$ revolves they all revolve together, one acting as an idle-wheel.

Upon the outer end of the shaft $n$ is secured the pinion $o$, which meshes with the large gear $p$ on the vertical shaft Q. Upon the upper end of this shaft Q are formed a number of studs or projections, $r$, which are arranged radially, as shown, and to its lower end is connected the valve or gate.

Formed upon the end of the long pivoted lever $s$ is the collar or loop $t$, of the shape indicated, and is beveled away upon the top of one half and the under side of the other half, so as to conform to the shape and position of the projections $r$. When the shaft Q is made to revolve in one direction, these studs catch against the under side of the collar, and as the studs are arranged spirally on the shaft, they keep raising the collar upward until it rests upon the top of the shaft; and when the shaft is revolved in the opposite direction, these projections catch over the top of the collar and force it downward toward the bearing $u$, in which the shaft is journaled.

When the collar is forced upward to the top of the shaft, the short end of the lever $s$ is forced downward upon the top of the short lever $v$, which has its outer end fastened to the same pronged rod 1 as the bent rod $h$, for connecting it to the collar $g$. To this short lever $v$ will be fastened a handle for the purpose of stopping the governor. When the speed has become sufficient to cause the balls $c$ to rise upward in their revolutions, the inner ends of the ball-arms force the collar $g$ through the rod $f$ downward; and this collar $g$, acting through the bent arm $h$, moves the clutch $j$ downward, so as to engage with the beveled gear $l$. This gear, in revolving, operates wheel $m$, shaft $n$, pinion $o$, and through them the vertical shaft Q, which is connected to the gate or valve. This shaft, in revolving at a certain rate of speed, keeps the valve or gate open to the desired extent; but when the speed is increased it causes the collar $t$ to rise upward, and the lever $s$ to bear downward upon the lever $v$. When the balls fall from the reduced speed, the clutch is forced up against the gear $k$, and then the loop $t$ is forced downward, and the motion of the shaft Q, being reversed, causes the gate or valve to open. This gate or valve may be connected directly to the shaft Q, or to a short shaft connected to the shaft Q, by means of small gear-wheels, or in any other way that may be preferred.

Having thus described my invention, I claim—

1. In a governor, the combination of the shaft to which the balls are connected, a connecting and reversing mechanism, and the shaft Q, the shaft Q having a valve or gate connected to its lower end, substantially as shown.

2. The combination of the double clutch $i$, wheels $k\ l\ m$, shaft $n$, pinion $o$, wheel $p$, shaft Q, provided with studs $r$, and lever $s$, having the loop $t$, substantially as set forth.

3. In a governor, the combination of the mechanism, substantially as herein described, for reversing the shaft Q, with the shaft Q, provided with studs $r$, and lever $s$, having the loop $t$, the short end of the lever $s$ being made to connect with the collar $g$ by means of the lever $v$, substantially as specified.

In testimony that I claim the foregoing I have hereunto set my hand this 5th day of March, 1878.

HENRY W. FOUTZ.

Witnesses:
J. P. ZIMMERMAN,
WM. B. RANKIN.